J. SCOTT.
Cam for Stamp-Mills.
No. 215,980. Patented May 27, 1879.
Fig. 1
Fig. 2
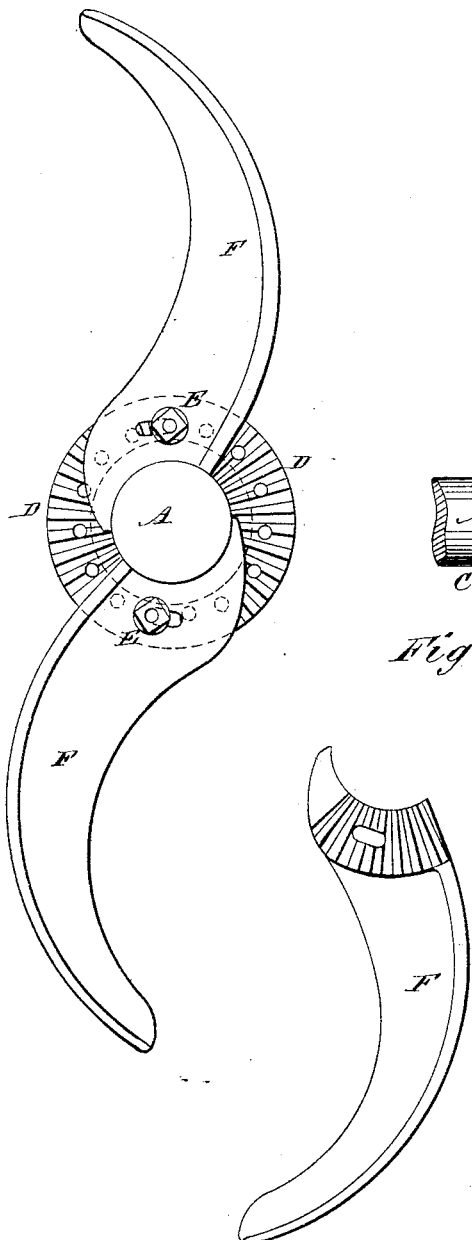
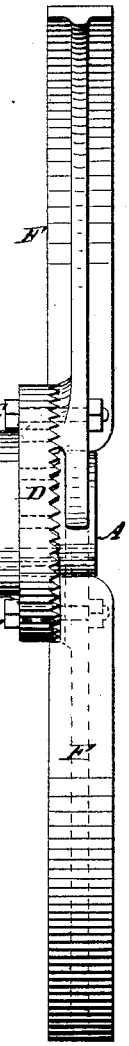
Fig. 3
WITNESSES:
C. Neveux
C. Sedgwick
INVENTOR:
J. Scott
BY
ATTORNEYS.

UNITED STATES PATENT OFFICE.

JAMES SCOTT, OF DENVER, COLORADO.

IMPROVEMENT IN CAMS FOR STAMP-MILLS.

Specification forming part of Letters Patent No. 215,980, dated May 27, 1879; application filed January 4, 1879.

*To all whom it may concern:*

Be it known that I, JAMES SCOTT, of Denver, in the county of Arapahoe and State of Colorado, have invented a new and useful Improvement in Cams for Stamp-Mills, of which the following is a specification.

Figure 1 is a side view of a set of my improved cams. Fig. 2 is a front view of the same. Fig. 3 is a detail side view of one of the cam-arms.

Similar letters of reference indicate corresponding parts.

The object of this invention is to furnish cams for stamp-mills, which may be so constructed that the hub may be keyed to the shaft independently of the cam-arms, which will allow the cam-arms to be adjusted upon any desired part of the hub, and which will allow either of the cam-arms to be detached and replaced with a new one without interfering with the other.

The invention consists in cams for stamp-mills, in which the hub is keyed to the shaft independently of the cam-arms, and has a flange formed around it at one end, provided with radial teeth or corrugations upon one side and numerous bolt holes formed through it, and the separate cam-arms provided with teeth or corrugations upon one side of their inner ends, and with elongated bolt-holes through the said inner ends to receive the bolts, by means of which they are secured to the said flange adjustably, as hereinafter fully described.

A represents the shaft to which the cams are to be attached. B is the cam-hub, which is fitted upon the shaft A, and is secured to it by a key, C.

Around one end of the hub B is formed a flange, D, one side of which is roughened with radial teeth or corrugations, and through the said flange are formed a number of holes to receive the bolt E, by means of which the cam-arms F are secured to the said flange D. The inner ends of the cam-arms F are concaved to fit against the side of the hub B or shaft A, and the inner side of the said ends is roughened with teeth or corrugations corresponding with the teeth of the flange D.

With this construction it is entirely immaterial in what position the hub B is keyed to the shaft A, as the cam-arms F can be easily adjusted in the required position.

With this construction, should one of the cam-arms break or wear out it can readily be replaced with a new one without interfering with the other. With this construction the strain upon the cam-arms will be borne by the teeth or corrugations, the bolts being only required to hold the said cam-arms snugly against the flange of the hub. The bolt-holes through the cam-arms may be elongated laterally, so that the said cam-arms can be adjusted with more exactness.

Having thus described my invention, I claim as new, and desire to secure by Letters Patent—

The combination of the cam-arms F, having concaved inner ends, and teeth or corrugations on the inner face of the said ends, and an elongated hole through the same, the hub B, having the flange D, provided with teeth or corrugations and a series of bolt-holes, and the bolt E, substantially as and for the purpose set forth.

JAMES SCOTT.

Witnesses:
PETER S. GLEIG,
JOSEPH COLLIER.